United States Patent [19]

Kitamura et al.

[11] Patent Number: 4,679,095
[45] Date of Patent: Jul. 7, 1987

[54] METHOD AND APPARATUS OF SCANNING AND RECORDING IMAGE

[75] Inventors: Hideaki Kitamura, Ibaragi; Mitsuhiko Yamada, Kyoto, both of Japan

[73] Assignee: Dainippon Screen Mfg. Co., Ltd., Kyoto, Japan

[21] Appl. No.: 747,346

[22] Filed: Jun. 21, 1985

[30] Foreign Application Priority Data

Jul. 6, 1984 [JP] Japan .................. 59-140996

[51] Int. Cl.⁴ .............................. H04N 1/40
[52] U.S. Cl. .................... 358/280; 358/256; 358/282; 358/287; 358/302
[58] Field of Search ............ 358/287, 280, 282, 80, 358/78, 77, 302, 256; 382/47; 364/523

[56] References Cited

U.S. PATENT DOCUMENTS

| | | | |
|---|---|---|---|
| 4,470,074 | 9/1984 | Yamada | 358/287 |
| 4,570,187 | 2/1986 | Ono et al. | 358/287 |
| 4,580,171 | 4/1986 | Arimoto | 358/287 |

FOREIGN PATENT DOCUMENTS

| | | |
|---|---|---|
| 2729113 | 1/1978 | Fed. Rep. of Germany . |
| 3047633 | 10/1981 | Fed. Rep. of Germany . |
| 1518578 | 7/1978 | United Kingdom . |
| 1540525 | 2/1979 | United Kingdom . |
| 1541554 | 3/1979 | United Kingdom . |
| 2067043 | 10/1983 | United Kingdom . |
| 2056814 | 3/1984 | United Kingdom . |
| 2104340 | 5/1985 | United Kingdom . |
| 2109191 | 7/1985 | United Kingdom . |

Primary Examiner—Edward L. Coles, Sr.
Attorney, Agent, or Firm—Brumbaugh, Graves, Donohue & Raymond

[57] ABSTRACT

A novel method of scanning and recording image and an apparatus for use thereof in which: plural original pictures are attached to an original picture cylinder; the trim-region of each original picture is designated on the original picture cylinder prior to recording a duplicate image; the image signals obtained by photoelectric scanning of the original picture from within its trim-region are sampled; the data thus sampled are subjected to statistical classification and treatment for obtaining the density data of each original picture; based on this density data, the scanning condition data necessary for the optimum gradation correction and optimum color correction are determined; these scanning condition data are stored at every original picture; and at the same time, the scanning condition data which were stored at every scanning of the original picture are successively set in the image scanning and recording apparatus, in photoelectric scanning for recording the duplicate image; thus sequential scanning and recording for the duplicates of the plural original pictures is performed.

7 Claims, 11 Drawing Figures

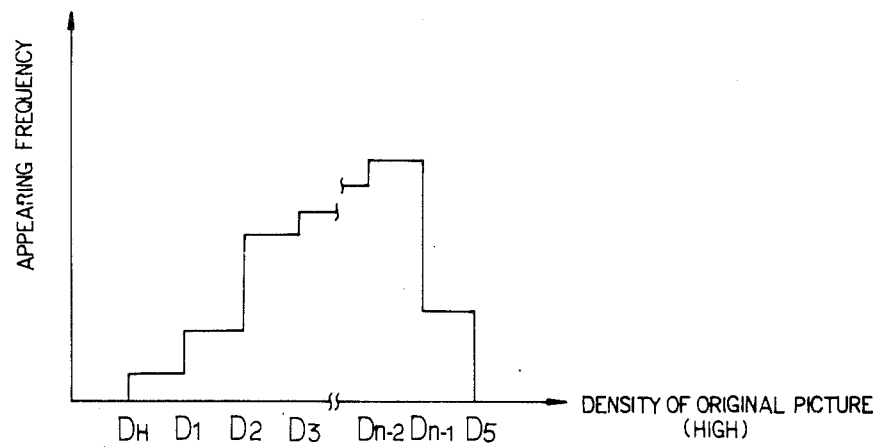

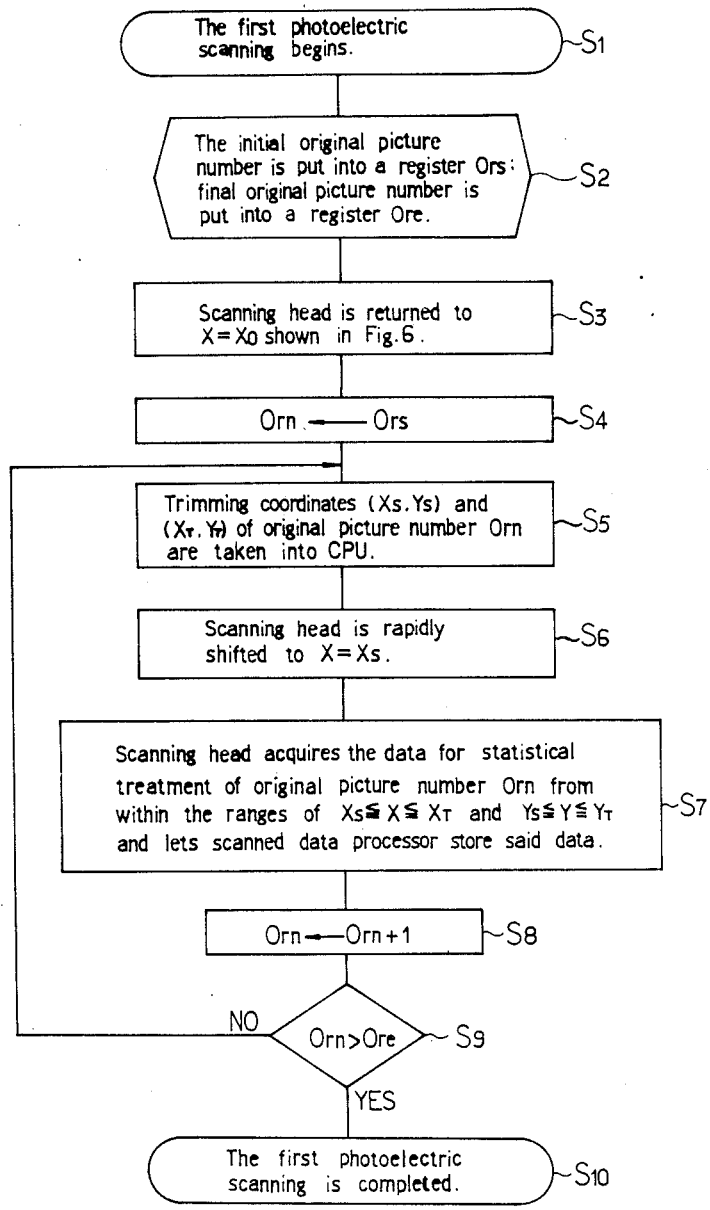

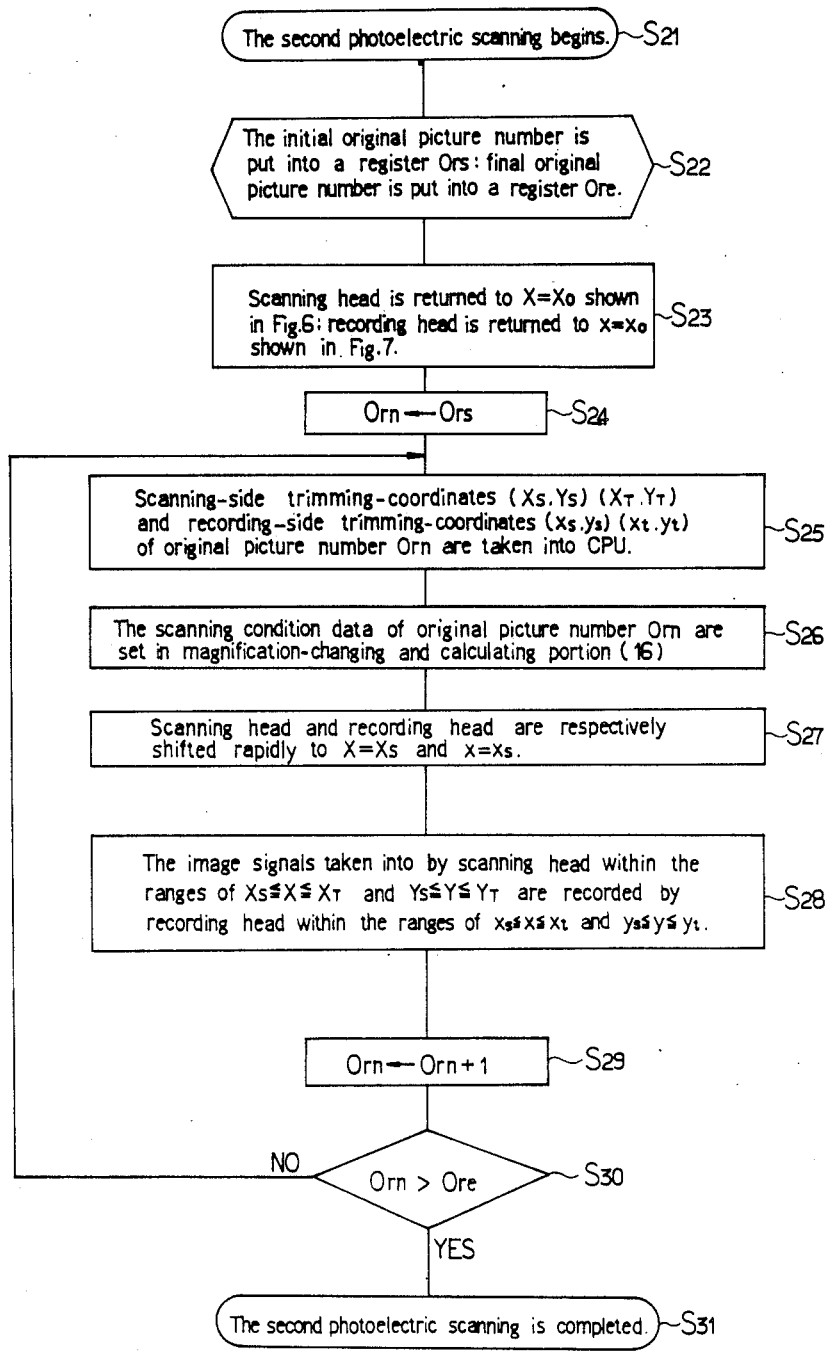

METHOD AND APPARATUS OF SCANNING AND RECORDING IMAGE

BACKGROUND OF THE INVENTION (1) Field of the Invention

This invention relates to a method and an apparatus for obtaining, at one time, the optimum duplicative color-separated plates for plural original pictures, in which: the plural original pictures are sequentially scanned and recorded, and the color-separated plates necessary for multicolor printing are made by an image scanning and recording apparatus such as a color scanner; and at that time, appropriate scanning conditions including highlight point, shadow point, gradation correction and color correction data, with which said image scanning and recording apparatus should be set up for every original picture, can be automatically determined.

(2) Description of Prior Art

Heretofore, in an image scanning and recording apparatus such as a color scanner, when plural original pictures different in characteristic with regard to tone, density, gradation and the like from each other are to be duplicatively recorded under peculiar duplicating desired for the pictures, it is a customary practice that the color scanner was set up with said duplicating conditions every time the original pictures are attached to the color scanner, and the original pictures are processed one by one. In the above case, during the period of setting up the duplicating conditions, the color scanner could not be operated its operating ratio being kept low thereby.

In view of the above-described problem, the applicant already proposed a method for enhancing serviceability ratio of a color scanner, in the Japanese laid open Patent Publication (unexamined) Sho. 56-29237, which comprises:

installing a setup-device for setting up a color scanner with duplicating conditions for each original picture (at an offline state, separately from the color scanner);

storing the same duplicating conditions in the memory of the same setup-device;

reading out said duplicating conditions for each original picture from said memory when these original pictures are actually attached to an input cylinder for undergoing scanning and recording;

setting up the color scanner with said duplicating conditions when the original pictures are scanned;

subjecting the plural original pictures parallely to photoelectric scanning by plural scanning means; and controlling a recording means by means of the image signals obtained from said plural scanning means to let the recording means record duplicate images at desired locations on photosensitive material.

However, the duplicating conditions for each original picture with which the color scanner is set up by said setup-device are, in most cases, are established for obtaining the images reproduced from the original images with utmost fidelity. Accordingly, an operator should selectively determine appropriate highlight and shadow points out of each colored original because the density range of one original picture usually differs from that of another original picture, then he should set up the color scanner with the density value of each of the said highlight and shadow points, thereby fitting the density range of said colored original to the reproducible range of said color scanner. These are his first tasks to do. And in case color-separated plates are to be prepared by the color scanner, he should also perform gradation correction and color correction to make duplicate prints better than the colored original themselves.

As mentioned above, the operator should determine the setup data for each original picture by means of the setup-device, and should store them in the memory at every original picture. However, it is a troublesome task for even a skilled operator to determine such basic setup data and to set up the color scanner with them skillfully and appropriately.

Thus, the applicant also proposed a method for automatically deciding appropriate scanning conditions for duplicating colored originals irrespective of the degree of an operator's skill, as is disclosed in the Japanese laid open Patent Publication (unexamined) Sho. 56-87044.

According to this method, the aforementioned setup-device is provided with a function of photoelectrically scanning colored originals, and in case appropriate values of highlight and shadow points should be decided, the area of such portions of density range as to be highlight and shadow points are calculated, at first, by the use of three color-separated density signal values $D_R$, $D_G$ and $D_B$ obtained by photoelectric scanning carried out all over the original picture in the sequential order of scanning. The portions whose areas are greater than the predetermined magnitude are respectively regarded as a highlight point and a shadow point. If such a point (a highlight point or a shadow point) exists plurally on the same original picture, selected is a portion where the three color-separated signals $D_R$, $D_G$ and $D_B$ are so balanced that they make almost a neutral color altogether. And this selected portion is regarded or discriminated as a highlight point or a shadow point, and the densities of these points are respectively designated as a highlight density $D_H$ and a shadow density $D_S$. In that case, such a point as a catchlight contained in the trim-region of the original picture should not be mis-selected as a highlight point. For that, the upper limit value of the highlight point which depends on the film material of the original picture should be set up. And if a still higher value is sampled when performing statistical treatment, it should be excluded from the statistical data.

Further, in case of deciding an appropriate characteristic for gradation correction, the distribution density range of the image (the range, $D_H$ to $D_S$) contained in said original picture and obtained from the foregoing highlight and shadow densities, is divided into n sections by the use of predetermined density boundary $D_i$, as shown in FIG. 2. Then, the frequency with which the density value included in each section appears is counted, and as a result, a frequency distribution as shown in FIG. 3 is obtained. Based on this frequency distribution, an operator or said setup-device can determine an appropirate gradation correction curve for said original picture.

In the above-mentioned conventional image recording method, and even in an image scanning and recording method in which plural original pictures are subjected to photoelectric scanning in the lump and in which appropriate conditions of adjustable items (such as highlight point, shadow point, gradation correction and color correction) which are to be set at the time of making color-separated plates necessary for multicolor printing can be automatically determined irrespective of the degree of an operator's skill, still there is needed an operator's manual operation of setting up a color scanner with the duplicating conditions which have been automatically determined at every original picture, on a scanner control panel. And also, there is needed an additional setup-device other than the color scanner apparatus, which raises the cost of the whole apparatus. Therefore, it is currently desired to provide a method and an apparatus by which to solve the above-mentioned problems thereby promoting the automatization and labor-reduction of image scanning and recording operation.

SUMMARY OF THE INVENTION

It is therefore an object of this invention to provide a novel method of scanning and recording image and an apparatus for use thereof which enables:

automatization and labor-reduction with regard to manual and troublesome tasks which have been conventionally needed for detecting scanning conditions of original pictures;

determination of appropriate gradation correction curves for original pictures; and duplicatively recording various original pictures having their respective and peculiar characteristics under desirable conditions at all times.

Another object of this invention is to provide a novel method of scanning and recording image and an apparatus for use thereof which enables remarkable labor-reduction and at the same time, obtention of duplicate images of excellent quality irrespective of the degree of an operator's skill.

A further object of this invention is to provide a novel method of scanning and recording image and an apparatus for use thereof which enables a setup-device which has been conventionally required separately to be unnecessary, and reducing the cost of said apparatus as a whole by providing said apparatus itself with the function to prepare scanning condition data.

This invention is characterized by its going through the following steps of process as the means to achieve the above-mentioned objects:

(1) attaching plural original pictures to an original picture inputting cylinder of an image scanning and recording apparatus;

(2) designating the trim-region of each original picture on said cylinder;

(3) performing photoelectric scanning of original pictures prior to image scanning and recording for obtaining image signals from within the trim-region of each original picture;

(4) sampling said image signals at a predetermined sampling pitch;

(5) subjecting said sampled data to statistical classification and treatment for obtaining the density data of the highlight point and the shadow point of each original picture;

(6) determining the scanning condition data necessary for the optimum gradation correction and color correction, on the basis of said density data.

(7) storing said scanning condition data, at every original picture; and (8) setting up successively the image scanning and recording apparatus with the above-mentioned scanning condition data stored at every scanning of original picture for scanning, recording and obtaining duplicate images.

This invention is also characterized by that the image scanning and recording apparatus are equipped with the means for materializing each of the above-mentioned stages of process.

This invention enables the optimum scanning condition data in an image scanning and recording apparatus such as a color scanner to be automatically determined within the function of said apparatus itself with regard to each of the plural original pictures attached to an original picture cylinder (while an operator has only to attach plural original pictures to be recorded in one lot to an original picture, cylinder, to designate the trim-region of each original picture and to designate the positions on recording film to print images on), thereby enabling successive automatic duplicative-recording of original pictures under appropriate conditions.

Other objects, features and advantage of this invention will become apparent in the course of the following description together with the accompanying drawings.

BRIEF DESCRIPTION OF THE DRAWINGS

In the accompanying drawings forming a part of this application, and in which like parts are designated reference numerals or characters throughout the same.

FIG. 2 shows how to divide the density of an original picture into sections of a distributed density range;

FIG. 3 shows how to obtain a frequency distribution showing the frequency with which a density value appears;

FIG. 10 is a flow chart showing the processing steps of the first photoelectric scanning; and FIG. 11 is a flow chart showing the processing steps of the second photoelectric scanning.

DESCRIPTION OF THE PREFERRED EMBODIMENT

Figure 1:
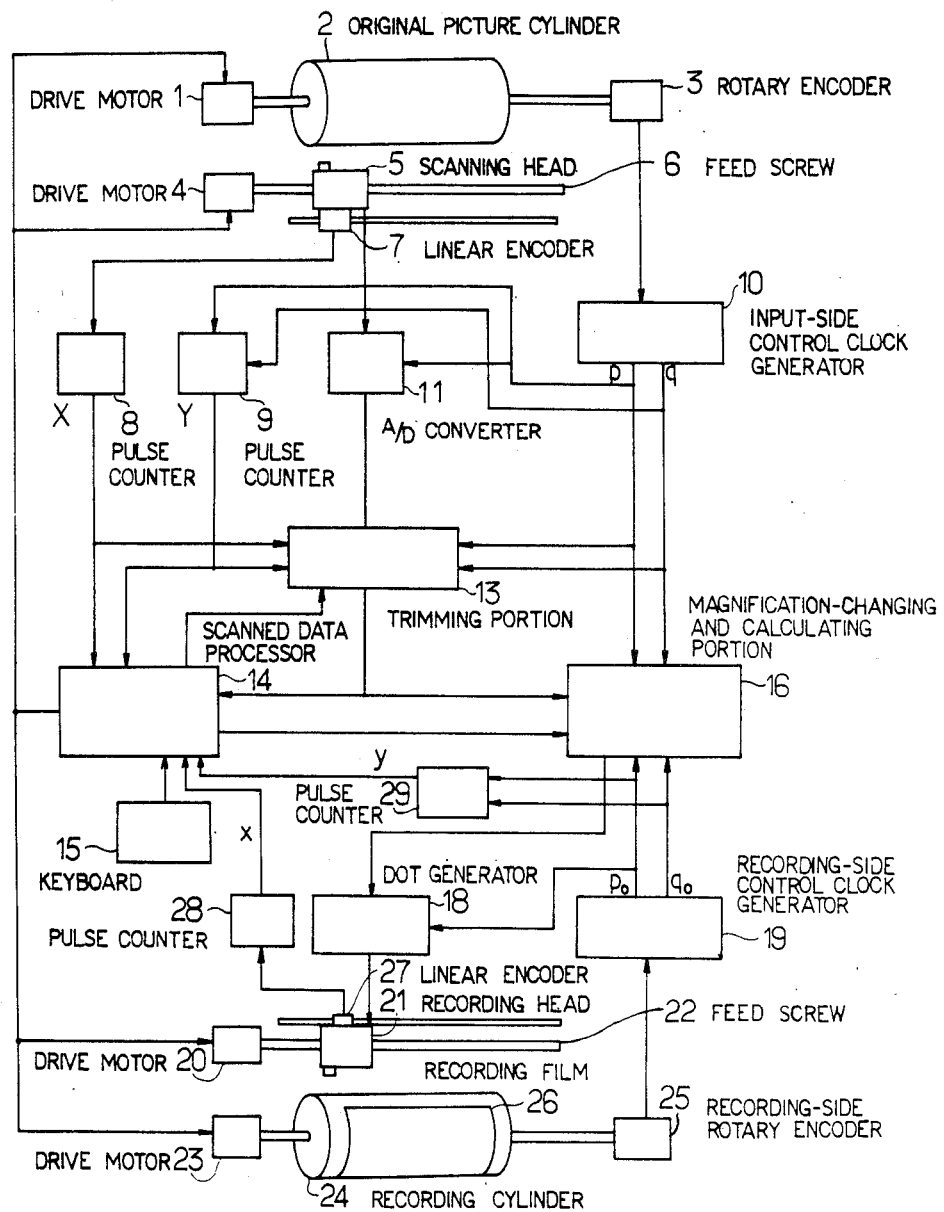
FIG. 1 is a block diagram showing an embodiment of an image scanning and recording apparatus of this invention.

Referring now to FIG. 1, a block diagram showing an example of an image scanning and recording apparatus of digital processing for embodying the method of this invention, an original picture cylinder (2) is rotated by a drive motor (1) at a constant speed. Image data held by the original pictures attached to original picture cylinder (2) are photoelectrically transduced by a scanning head (5) in the order of scanning lines, the scanning head (5) being moved by a drive motor (4) and a feed screw (6) at a constant speed. An input-side control clock generator (10) multiplies the phase pulse from a rotary encoder (3), thereby producing an input-side sampling clock (P). Said photoelectrically transduced image data are then digitized by said input-side sampling clock (P) at an A/D converter (11). Based on the coordinate data (trimming data) set by a scanned data processor (14), said digitized image data extract, at a trimming portion (13), only the image data of trim-regions which are necessary for subsequent processing.

Said image data of trim-regions are transferred to the scanned data processor (14) at the first photoelectric scanning, and to a magnification-changing and calculating unit (16) (hereinafter, abbreviated as "calculating unit (16)") at the second photoelectric scanning, the first and second photoelectric scanning being described later. The scanned data processor (14) processes its input data statistically into scanning condition data, and the calculating unit (16) is then set up with said scanning condition data at every original picture.

At the calculating unit (16), predetermined magnification change is performed, and at the same time, conversion from three color-separated signals of red (R), green (G) and blue (B) into four color-printing signals of yellow (Y), magenta (M), cyan (C) and black (K) and gradation correction are performed. Image data for four color-plates are rearranged for recording into such a pattern that the four colors (each belonging to each color-plate) are distributed in parallel with each other or a pattern that the same four colors are distributed in sequential order in the main recording-scanning direction. A dot generator (18) is a device in which its input image signals of, e.g., 256 levels represented by 8 bits are electronically converted into dots of large or small sizes as required for printing in accordance with said levels. The image data converted into dots at the dot generator (18) are subjected to photoelectric scanning by a recording head (21) which is moved by a drive motor (20) and a feed screw (22) at a constant speed in the sub-scanning direction, and then they are printed as duplicate images on recording film (26) wrapped around a recording cylinder (24) which is rotated by a drive motor (23) at a constant speed. A recording-side control clock generator (19) multiplies the phase pulse from a recording-side rotary encoder (25) by the use of PLL, thereby producing a recording clock (Po) which synchronizes with the rotation of recording cylinder (24), and a pulse ($q_o$) which represents one rotation of recording cylinder (24). By the use of such clock ($P_o$) and pulse ($q_o$), the clock generator (19) controls the transmission of the image data after they are outputted from the calculating portion (16). The function of a keyboard (15) is to perform the setting of the trim-regions or the setting of magnification for duplicative recording on the recording cylinder (24). And, in addition to the above, the keyboard (15) can input various setting condition data, if necessary.

Pulse counters (9) and (29) receive and count the pulses outputted from rotary encoders (3) and (25) via the input-side and recording-side control clock generators (10) and (19), thereby producing the scanning position coordinates in the rotational direction (Y,y). Pulse counters (8) and (28) count the pulses outputted from linear encoders (7) and (27), thereby producing the scanning position coordinates in the axial direction (X,x) of the heads (5) and (21).

The above-mentioned is the outline of the construction of the apparatus shown in FIG. 1. Then, the image scanning and recording by the same apparatus will be described in the following divided into three processing stages:

(THE FIRST STAGE)

Figure 6:
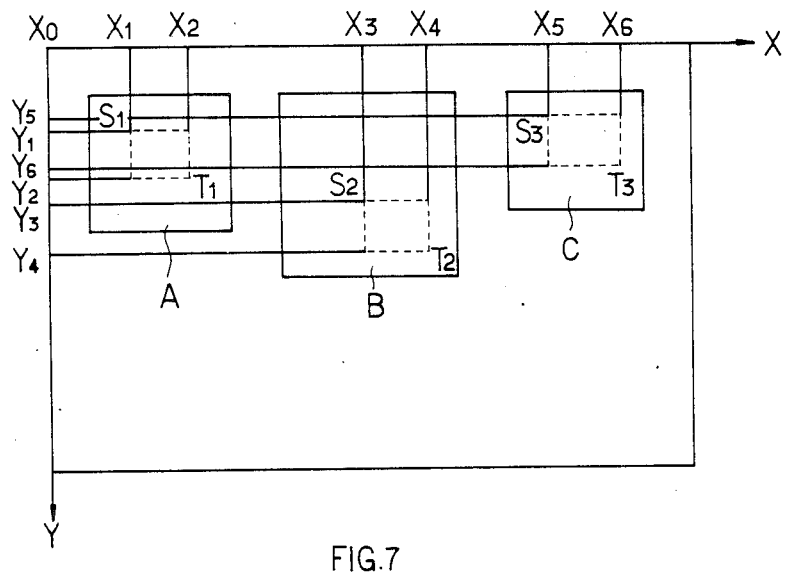
FIG. 6 shows how to lay out original pictures on an input cylinder and how to designate their trim-regions.

An operator attaches plural original pictures whose processing is desired at one time to the original picture cylinder (2), sets up the second data processor (14) with predetermined condition data like magnification by means of a keyboard (15), store the data in the same processor (14), acquires the signal of the coordinates S and T of the two points for fixing the trim-region of each original picture as shown in FIG. 6 by lightening the pictures with a light beam spot emitted from the scanning head (details thereof will be given later), and store the same signal of the coordinates in the scanned data processor (14).

(THE SECOND STAGE)

The scanned data processor (14) performs the first photoelectric scanning, acquires (from the image data obtained by the same scanning) the data of the optimum highlight and shadow points, the optimum gradation correction curve, and the optimum color correction of each original picture by the use of the method as will be detailed later, and stores these data as the scanning condition data of each original picture.

(THE THIRD STAGE)

In this stage, the second photoelectric scanning is carried out. Every time the scanning and recording of each original picture begins, the scanned data processor (14) sets up the calculating (16) with the optimum scanning condition data for the same original picture obtained in the second stage, thereby enabling the most desirable duplicate images to be recorded on a recording film (26) attached to the recording cylinder (24).

The procedure for each processing stage will be further detailed in the following.

At the first stage, the keyboard (15) sets up the scanned data processor (14) with the predetermined condition data like magnification and lets them be stored therein. Then trim-regions are fixed on the original picture cylinder. For instance, the original pictures whose duplicative recording is desired at one time are designated as original pictures (A), (B) and (C). The state how they are mounted on the original picture cylinder (2) is shown in FIG. 6, a development diagram of the original picture cylinder. In the figure, $S_1$, $T_1$, $S_2$, $T_2$, $S_3$, and $T_3$ denotes respectively the coordinate points showing the trim-regions (broken line portions) of the original pictures (A), (B) and (C). An operator moves the scanning head to the position at which the light beam spot emitted from the scanning head etc. lightens each of said coordinate points, and lets the coordinate values of each point be taken into scanned data processor (14), while indicating a specific trimming point of a specified original picture to which each point belongs by means of the keyboard (15) shown in FIG. 1. These coordinate values indicated by the scanning head are then established as follows.

Namely at first, the reference position (the origin of the subsidiary scanning direction of the original picture cylinder) is decided by a magnetic switch or the like (not shown). Then the pulses from the linear encoder (7) which are dependent on the distance of the scanning head from said reference position are integrated (when the scanning head returns toward the origin, the integrated value is decreased) by the pulse counter (8) (up-down counter). The X coordinate value (the coordinate value in the subsidiary scanning direction) is established by the above integrated value. Next, the reference position (the origin of the main scanning direction of the original picture cylinder) is decided at such position as the rotary encoder (3) generates one rotation pulse. Based on such reference position, the number of clock pulses in the main scanning direction is integrated by pulse counter (9). Then Y direction (the main scanning direction) coordinate value is established by the above integrated value. The abovementioned is equally applicable to the coordinate values in the recording side.

At the second stage, the first photoelectric scanning is performed. Based on the trimming coordinates on the original picture cylinder (2) for each original picture obtained in the first stage, $S_1$ ($X_1$, $Y_1$), $T_1$ ($X_2$, $Y_2$), $S_2$ ($X_3$, $Y_3$), $T_2$ ($X_4$, $Y_4$), $S_3$ ($X_5$, $Y_5$) and $T_3$ ($X_6$, $Y_6$) shown in FIG. 6, the sampling image data for statistical treatment are taken from within the trim-region of each original picture, and made to be stored in the scanned data processor (14). The processing steps of this first photoelectric scanning are shown in a flow chart of FIG. 10.

The flow chart in FIG. 10 will be explained hereunder. In the figure, the original picture number of original pictures (A), (B), (C) are designated as 1, 2, 3, and the coordinates of coordinate points S and T of the trim-regions of the original pictures (A), (B), (C) are designated as ($X_S$, $Y_S$) and ($X_T$, $Y_T$).

At step $S_2$, the original picture number from which initial statistical treatment data are acquired (the smallest picture number) is put into a register $O_{rs}$, and the original picture number from which final statistical treatment data are acquired (the largest picture number) is put into a register $O_{re}$.

At step $S_3$, the scanning head is returned to $X=X_o$, $X_o$ being shown in FIG. 6.

At step $S_4$, the original picture number which is in the register $O_{rs}$ is put into the register $O_{rn}$.

At step $S_5$, the trimming coordinates ($X_S$, $Y_S$) and ($X_T$, $Y_T$) of the original picture number $O_{rn}$ are taken into a central processing unit (CPU) (not shown).

At step $S_6$, the scanning head (5) is rapidly shifted to $X=X_S$.

At step $S_7$, the scanning head (5) acquires the image data, for statistical treatment, of the original picture number $O_{rn}$ from within the ranges of $X_S \leq X \leq X_T$, and $Y_S \leq Y \leq Y_T$, and lets the scanned data processor (14) store said data.

At step $S_8$, the original picture number $O_{rn}$ is increased by one (the number existing in the register $O_{rn}$ is taken out and the number increased by one is returned into the same register $O_{rn}$).

At step $S_9$, said number $O_{rn}$ is compared with the final original picture number $O_{re}$. And if any original pictures whose image data for statistical treatment have not yet been acquired are found to be remaining, the judgment at step $S_9$ becomes "NO". Thus, the processing step returns to step 5 and therefrom, the foregoing procedures are repeated. When the image data for statistical treatment for all the original pictures were completely acquired, the judgment at step $S_9$ becomes "YES", and the first photoelectric scanning is completed (step $S_{10}$).

In this manner, the image data for statistical treatment on the original pictures (A), (B) and (C) are acquired. The sampled image data of each original picture thus acquired are then processed in such a way as was already proposed by the applicant and disclosed in the Japanese laid open Patent Publication (unexamined) Sho. 56-87044 which comprises calculating the areas of the portions of density range which can be highlight and shadow points, deeming said portions having the areas attaining the predetermined values to be highlight and shadow points, dividing the distributed density range of the image into several sections by the predetermined boundary density values as shown in FIG. 2, counting the frequency with which the density value included in each section appears and obtaining the frequency distribution of the densities of sampled picture elements as shown in FIG. 3. The processing for obtaining scanning condition data by statistically treating said sampled data on each original picture is performed in the CPU existing in the scanned data processor (14), so in the following, the method how to obtain an appropriate gradation correction curve from the aforementioned frequency distribution is described.

Figure 4:
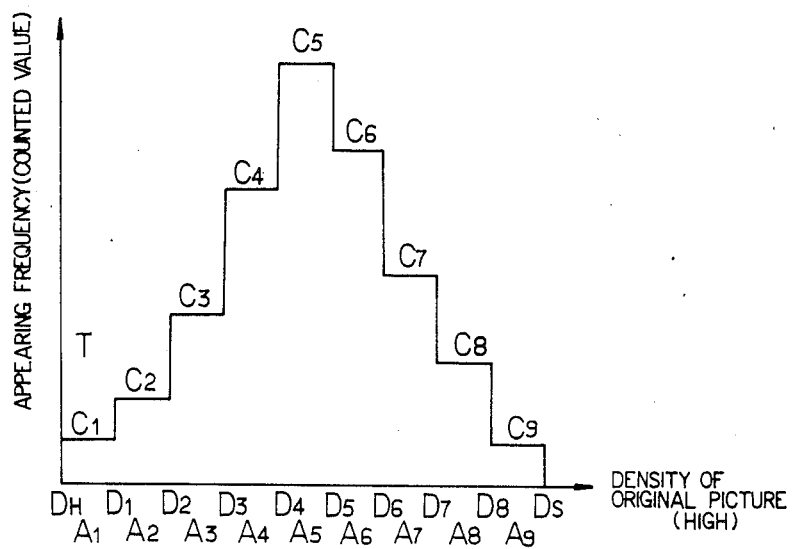
FIG. 4 shows a frequency destribution for explaining this invention.

The case when the frequency distribution of the densities of the picture elements sampled from within the trim-region of an original picture is like FIG. 4 is detailed hereunder. In the figure, it is shown that a density range ($A_1$) has a range from the highlight point density ($D_H$) to a density ($D_1$) and the counted value of the picture elements falling within this range is denoted as ($C_1$). Such is the same with regard to each of the density ranges ($A_2$) to ($A_9$). From this frequency distribution, the optimum gradation correction curve as shown by the broken line in FIG. 5 can be obtained as is explained in the following.

If C denotes the total sum of said counted values regarding FIG. 4, C is given by equation (1):

$$C = \sum_{i=1}^{9} C_i \tag{1}$$

It is assumed that T denotes the density width of each of the above-mentioned density ranges, while the density range reproducible by printing for duplicate image is predetermined as ranging from a highlight density $D_{HP}$ to a shadow density $D_{SP}$.

It is designed that the gradient $m_i$ of the part of the broken line for each density range (in FIG. 5) is dependent on its corresponding frequency $C_i$ (in FIG. 4), i.e., the larger the ratio "$C_i$ to C(total frequency)" is, the larger the gradient $m_i$ becomes. Thereby it is intended that the gradation of such picture elements belonging to the density ranges which are included abundantly in the original picture be emphasized, thereby emphasizing and better finishing the gradation of the duplicate image as a whole.

Now, if N denotes the number of density ranges divided, the average gradient $\overline{m}$ in each density range is given by equation (2):

$$\overline{m} = \frac{\frac{D_{SP} - D_{HP}}{N}}{T} \tag{2}$$

On the other hand, the average frequency $\overline{C}$ in each density range is given by equation (3);

$$\overline{C} = \frac{C}{N} \tag{3}$$

Figure 5:
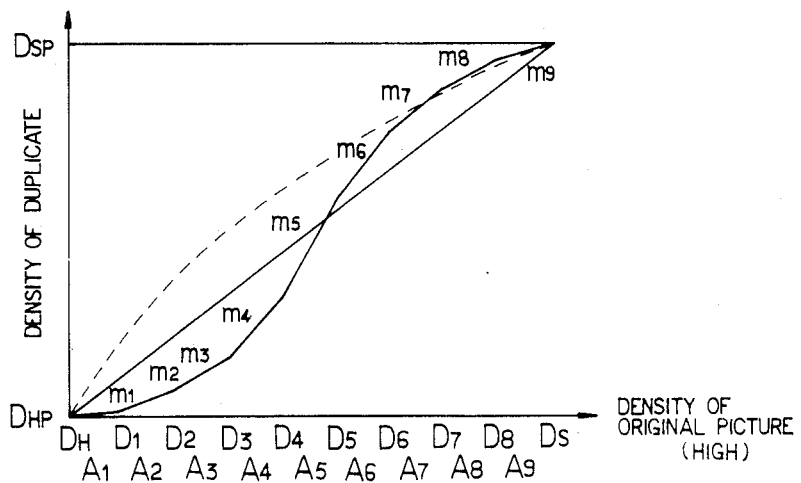
FIG. 5 shows how to obtain the optimum gradation correction curve out of the frequency distribution of FIG. 4.

If these equations are used, the gradient $m_i$ of the broken line of FIG. 5 is given by equation (4):

$$m_i = \bar{m} \times \frac{C_i}{\bar{C}} \quad (4)$$

This equation can be established, because each density region contributes to the average gradient $\bar{m}$ (in FIG. 5) by the ratio "$C_i$ to $\bar{C}$(average frequency)". The correction curve shown in FIG. 5 is an exaggerated one for the sake of explanation. In the figure, the curve data is modified into a usually adopted gradation curve (illustrated in a dotted line, as an example) whose highlight portion is extended and shadow portion is compressed in accordance with the difference between the original picture density range and the print density range.

The broken line, as is shown in FIG. 5, itself may be used as the optimum gradation correction curve. But in this case, if the bends at end points of each density range adversely effect the image to be duplicated, a smoothed curve obtained by applying interpolation between said end points by an appropriate function may be used as the optimum gradation correction curve.

The optimum gradation correction curve thus obtained is stored in the scanned data processor (14), correspondingly to each original picture. But as for an original picture whose gradation correction curve is given in advance, the same curve is subjected to such modification that the end points of the curve come in accord with the highlight and shadow points which are obtained by the first photoelectric scanning and to other necessary modification. The curve thus modified is again stored in the scanned data processor (14).

Based on this optimum gradation correction curve, the color gradation correction curve for each color plate and the like are obtained (e.g., as is disclosed in the Japanese laid open Patent Publication (unexamined) Sho. 56-87044). Such data are stored in the scanned data processor (14) correspondingly to the original pictures (A), (B) and (C).

The above-mentioned process is performed on all the original pictures attached to the original picture cylinder (2), the results thereof are stored in the scanned data processor (14), and thus the second stage of processing is completed.

Now, it is possible to appropriately sample the data from the original pictures to reduce the quantity of the image data to be statistically treated, by roughening the sampling pitch in the first photoelectric scanning than the photoelectric scanning for recording duplicate images (the second photoelectric scanning), as occasion demands. By doing this, it is possible to minimize the calculation for statistical treatment and to enhance the efficiency of the same treatment. Further, it is possible to obtain the gradation correction curve and color correction data by the use of other statistical method than the aforementioned method. When necessary for it, the first photoelectric scanning, i.e., the photoelectric scanning prior to the image scanning and recroding may be performed several times.

For instance, there is such a case, in which only some portion of "trim-region for output" of the original picture is important and demands to be duplicatively recorded by the use of aforementioned optimum gradation correction curve and other portion (e.g., background) of "trim-region for output" is not so important (e.g., it is uniformly dark). In the above case, it is unfavorable to let "trim-region for statistical treatment of gradation" be identical with "trim-region for output".

In this case, for instance, the first photoelectric scanning should be performed in two times. The scanning of the first time is to determine the densities of highlight and shadow points through the photoelectric scanning within "trim-region for output". And the scanning of the second time is the photoelectric scanning within "trim-region for statistical treatment of gradation", and for doing this kind of scanning, it is necessary to designate "trim-region for statistical treatment of gradation" in advance.

Further, in case it takes a long time to perform the above-mentioned data processing, it may be possible to complete, at first, all the processing of one original picture, till then keeping the first photoelectric scanning of the next original picture waiting.

Figure 7:
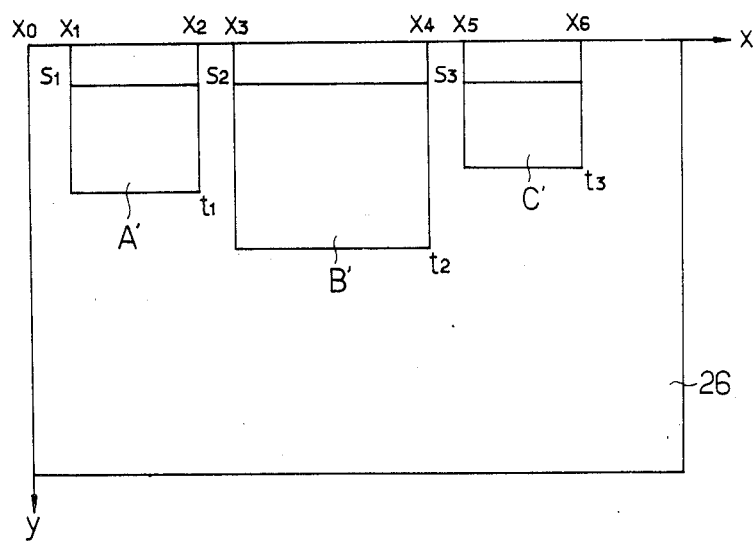
FIG. 7 shows a layout of duplicated pictures on recording film.

In the third stage next to the above mentioned second stage, the recording cylinder (24) is firstly driven, and the trim-regions as shown in FIG. 6 are printed onto the recording film in accordance with a layout designation as shown in FIG. 7. Namely, in accordance with the methods proposed by the applicant and disclosed in the specifications of the Japanese laid open Patent Publications (unexamined) Sho. 56-31273 and Sho. 56-29237, the plural original pictures attached to the original picture cylinder (2) as shown in FIG. 6 are printed on the recording film (26) attached to the recording cylinder (24) as shown in FIG. 7, successively by the second photoelectric scanning, on the basis of the condition data (like magnification) established in advance by the keyboard (15), and the gradation correction curves and color modification data obtained by the first photoelectric scanning. Duplicate pictures (A'), (B') and (C') as shown in FIG. 7 are respectively the products of duplicative recordings of the designated trim-regions of the original pictures (A), (B) and (C) as shown in FIG. 6 at required magnification. Trimming points $(s_1, t_1)$, $(s_2, t_2)$ and $(s_3, t_3)$, and x-coordinates $x_1$, $x_2$, $x_3$, $x_4$, $x_5$ and $x_6$ correspond respectively to the trimming points $(S_1, T_1)$, $(S_2, T_2)$ and $(S_3, T_3)$, and the X-coordinates $X_1$, $X_2$, $X_3$, $X_4$, $X_5$ and $X_6$.

The process in the second photoelectric scanning is shown in the flow chart, FIG. 11.

At step $S_{22}$, the original picture number (the smallest picture number) for the picture to be subjected to initial photoelectric scanning is put into the register $O_{rs}$; the original picture number (the largest picture number) for the picture to be subjected to final photoelectric scanning is put into the register $O_{re}$.

At step $S_{23}$, the scanning head (5) is returned to $X = X_o$ shown in FIG. 6 and the recording head (21) is returned to $x = x_o$ shown in FIG. 7.

At step $S_{24}$, the picture number existing in the register $O_{rs}$ is put into the register $O_{rn}$.

At step $S_{25}$, scanning-side trimming-coordinates $(X_S, Y_S)$ and $(X_T, Y_T)$, and, recording-side trimming-coordinates $(x_s, y_s)$ and $(x_t, y_t)$, of the original piture number $O_{rn}$, are taken into the CPU.

At step $S_{26}$, the magnification data stored in the scanned data processor (14) are set in the calculating portion (16), and the scanning condition data of the original picture number $O_{rn}$ which were obtained in the first photoelectric scanning and stored in the scanned data processor (14) are set in the calculating portion (16).

At step $S_{27}$, the scanning head (5) and the recroding head (21) are respectively shifted rapidly to $X = X_S$ and $x = x_S$.

At step $S_{28}$, the image signals taken into by the scanning head (5) within the ranges of $X_S \leq X \leq X_T$ and $Y_S \leq Y \leq Y_T$ go through the A/D converter (11), the trimming portion (13), the calculating portion (16) and the dot generator (18), and reach the recording head (21). Then the above image signals are recorded on the recording film (26) within the ranges of $x_s \leq x \leq x_t$ and $y_s \leq y \leq y_t$ by the recording head (21).

At step $S_{29}$, as was described at the step $S_8$, the original picture number $O_{rn}$ is increased by one. At step $S_{30}$, as was described at the step $S_9$, if there are any original pictures which have yet to be scanned and recorded are found to be remaining, the steps $S_{25}$ to $S_{28}$ are repeated. When all the original pictures are completely scanned and recorded, the second photoelectric scanning is completed (step $S_{31}$).

In such a way, the original pictures (A), (B) and (C) are sequentially and duplicatively recorded.

In the above, the procedures from the first to third stage were illustrated with an example of a digitally processed image scanning and recording apparatus. But it is also possible to apply this invention to an analog-processed image scanning and recording apparatus by inserting A/D or D/A converters into the portions of said apparatus where they are required.

Further, though some of the original pictures to be printed at the third stage are duplicatively recorded in accordance with the scanning conditions obtained at the first and second stages of processing, the original pictures especially appointed can be duplicatively recorded on the basis of the scanning conditions given by the keyboard in advance without being subjected to the second stage of processings. By virtue of such a function, it is possible to perform printing of duplicate images on the basis of special scanning conditions without depending on statistical treatment. Needless to say, it it possible to replace part of the scanning condition data obtained by statistical treatment with the condition data given in advance.

Further, in some case, it is unnecessary to input magnification information by the keyboard (15), if the trim-regions for duplicative recording are set by the keyboard (15) and the trim-regions for the original pictures are set by the scanning head.

This invention can be applied to usually practiced scannings of original pictures on point by point basis in addition to such an application as stated in the foregoing embodiment.

Figure 8:
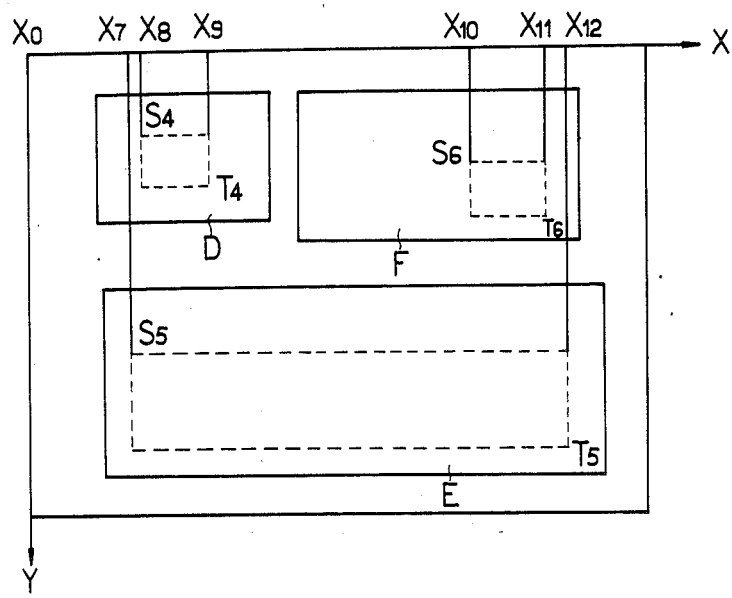
FIG. 8 shows a layout and trim-regions of original pictures for explaining another embodiment of this invention.
Figure 9:
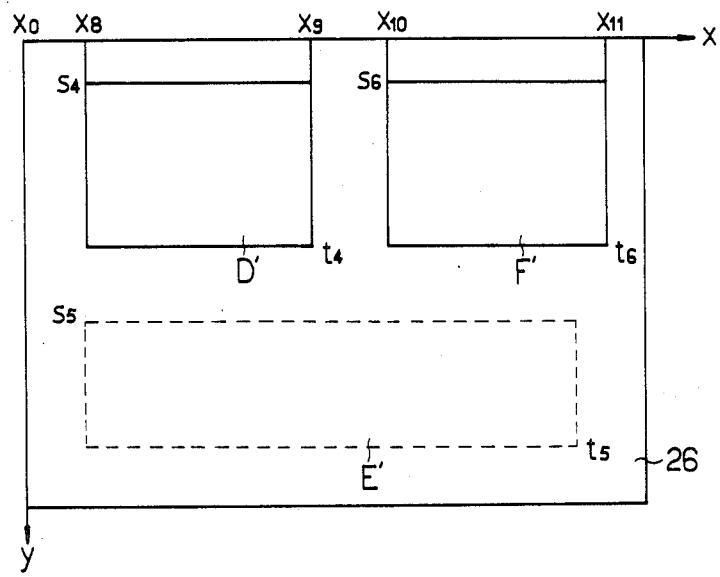
FIG. 9 shows a layout of duplicated pictures on a recording film corresponding to the original pictures as are shown in FIG. 8.

Furthermore, if the timing of printing of duplicate image is enabled to delay by controlling the drive motor (20) (shown in FIG. 1) by the scanned data processor (14), it is possible, e.g., to duplicatively record a original picture (D) attached to the original picture cylinder (shown in FIG. 8) by the second photoelectric scanning and at the same time, to perform the first photoelectric scanning of an original picture (E) which lies on the same main scanning line of said second scanning of the picture (D). Namely, at first, the first photoelectric scanning of the original pictures (D) and (F) is performed for obtaining scanning condition data, and then on the basis of said condition data, the second photoelectric scanning is performed for outputting duplicated pictures (D') and (F') respectively on their corresponding positions on the recording film (26) (shown in FIG. 9). And, when performing the said second photoelectric scanning, if the first photoelectric scanning of the original picture (E) is performed at the same time, the time for the latter scanning can be saved that much.

It should also be understood that the foregoing relates to only preferred embodiments of the invention, and that it is intended to cover all changes and modifications of the example of the invention herein chosen for the purposes of the disclosure, which do not constitute from the spirit and scope of the invention.

We claim:

1. A method of scanning and recording images, comprising the steps of:
   attaching a plurality of original pictures to an original picture cylinder;
   setting trim-regions in respective pictures of said plurality of original pictures;
   preliminarily photoelectrically scanning said trim-regions of said respective original pictures so as to obtain signals therefor;
   sampling said image signals at a predetermined pitch;
   subjecting said sampled image signals to statistical classification and treatment for obtaining density data of a high light point and a shadow point of each original picture;
   determining respective scanning condition data necessary for an optimum gradation correction and an optimum color correction for each said original picture based upon said density data;
   storing said scanning condition data on each original picture of said plurality of original pictures;
   successively setting up an image scanning and recording apparatus with respective scanning condition data of said scanning condition data previously stored; and
   sequentially scanning and recording for duplicates of said plurality of original pictures based on respective scanning condition data on respective original pictures set up in the setting up step.

2. A method of scanning and recording image as set forth in claim 1, wherein said step of photoelectrically scanning includes scanning the original pictures at least once prior to recording the duplicate images in a rougher pitch than a sampling pitch of the photoelectric scanning for recording the duplicate images.

3. A method of scanning and recording image as set forth in claim 1, wherein some of the plurality of original pictures are duplicatively recorded on the basis of predetermined scanning condition data.

4. A method of scanning and recording image as set forth in claim 1, wherein said step of determining respective scanning condition data for optimum gradation correction regarding an image within the trim-region of each original picture includes sampling color-separated image signals at a predetermined sampling pitch by photoelectrically scanning prior to recording the duplicate image, dividing a distributed density range of the sampled color-separated image signals into a plurality of density ranges having a constant density width by using a predetermined distributed density range and boundary density values, counting and recording a frequency with which each of said color-separated image signals appears, in each divided density range, thereby obtaining a distribution characteristic of densities of picture elements included in the image within the trim-region of said original picture, obtaining a gradient of reproducible gradation characteristic in each density region from the counted frequency value in each density range in said distribution characteristic, a total of said counted values, and density reproducible range in duplicating printing, obtaining, on the basis of said gradient, a broken line beginning at the highlight point and ending at the shadow point, and selectively subjecting said broken line to a smoothing procedure.

5. A method of scanning and recording image as set forth in claim 1, wherein said step of setting trim-region includes classifying the trim-region for each original picture into a trim-region for statistical treatment and a trim-region for an output to be duplicatively recorded, and establishing it as such, classifying said trim-region for statistical treatment into a trim-region for deciding the highlight point and the shadow point and a trim-region for statistical treatment of gradation, and establishign it as such, and the step of scanning prior to recording the duplicate image is performed separately several times to the trim-region for deciding the highlight point and the shadow point and to the trim-region for statistical treatment of gradation.

6. A method of scanning and recording image as set forth in claim 1, wherein one picture is subjected to the photoelectric scanning for duplicative recording, and at the same time, the same scanning serves as the photoelectric scanning prior to duplicative recording of the other picture, in case the plural original pictures are attached to the original picture cylinder and the two pictures out of them are placed before and behind on the same main scanning lines.

7. An image scanning and recording apparatus comprising:
  means for designating trim-regions of a plurality of original pictures attached to an original picture cylinder;
  means for subjecting image signals, obtained from within the trim-region of each original picture by photoelectrically scanning prior to recording a duplicate image, to statistical classification and treatment, so as to obtain optimum scanning condition data;
  means for storing said scanning condition data, at every original picture; and
  means for setting up said image scanning and recording apparatus with the scanning condition data stored in said storing means, sequentially at every scan of an original picture, by photoelectrically scanning the duplicate image for recording.

* * * * *

UNITED STATES PATENT AND TRADEMARK OFFICE
CERTIFICATE OF CORRECTION

PATENT NO. : 4,679,095

DATED : July 7, 1987

INVENTOR(S) : Kitamura et al.

It is certified that error appears in the above-identified patent and that said Letters Patent is hereby corrected as shown below:

On the Title Page:

Item [56], Column 2, under "2109191 7/1985 United Kingdom" add

```
--5629237   8-16-79   Japan
  5687044  12-17-79   Japan
  5631273   8-24-79   Japan--
```

Signed and Sealed this

Ninth Day of February, 1988

Attest:

DONALD J. QUIGG

Attesting Officer

Commissioner of Patents and Trademarks